United States Patent [19]

Supino, Jr. et al.

[11] Patent Number: 5,053,892

[45] Date of Patent: Oct. 1, 1991

[54] THIN FILM HEAD READ RECOVERY

[75] Inventors: Louis Supino, Jr.; Joseph M. Rinaldis, both of Colorado Springs, Colo.

[73] Assignee: Digital Equipment Corporation, Maynard, Mass.

[21] Appl. No.: 505,650

[22] Filed: Mar. 13, 1990

Related U.S. Application Data

[63] Continuation of Ser. No. 188,047, Apr. 29, 1988, abandoned.

[51] Int. Cl.$^5$ .......................... G11B 15/12; G11B 5/02
[52] U.S. Cl. ........................................ 360/62; 360/53; 360/111
[58] Field of Search ...................... 360/31, 53, 62, 111

[56] References Cited

U.S. PATENT DOCUMENTS

| Re. 31,166 | 3/1983 | Korda | 360/53 |
|---|---|---|---|
| 3,550,103 | 12/1970 | Cogar | 360/53 |
| 4,516,165 | 5/1985 | Cunningham et al. | 360/53 |
| 4,812,928 | 3/1989 | Kraus | 360/53 |

Primary Examiner—Vincent P. Canney
Attorney, Agent, or Firm—Fish & Richardson

[57] ABSTRACT

A thin film magnetic read/write head is conditioned by (i) causing the head to perform a first operation (e.g., a read operation), (ii) determining if the first operation was performed acceptably, and (iii) if not, causing the head to perform a second operation (e.g., a write operation) that is capable of increasing the likelihood that the head will be able to perform the first operation acceptably.

14 Claims, 2 Drawing Sheets

THIN FILM HEAD READ RECOVERY

This is a continuation of copending application Ser. No. 07/188,047 filed on Apr. 29, 1988, now abandoned.

BACKGROUND OF THE INVENTION

This invention relates to thin film magnetic read/write heads.

When a write current is applied to a typical thin-film read/write head, the resulting write field causes the full width of the tip of each pole of the head to be spanned by a single magnetic domain. When the write current is removed, so-called closure domains and central domains are reformed within the head in a configuration that minimizes the sum of the magnetostatic, anisotropic, and exchange energy of the magnetic particles in the head. The precise configuration of the reformed domains will depend on, for example, stress from the alumina layers in the vicinity of the permalloy material that forms the head, the iron/nickel ratio in the permalloy composition, defects in the permalloy material, and the profile of the write current as it is reduced to zero. Thus, the domain configuration after a write operation may differ slightly from the domain configuration prior to the write operation.

When the head is used to read data on a track of a magnetic disk, the field generated by the data element being read from the disk is passed along the pole of the head by slight rotation of the magnetizations in the central domains and small movements of the domain walls, but without altering the general domain configuration. The effectiveness of a read operation will depend on the particular domain configuration that resulted from the most recent write operation.

Viewed at a less microscopic level, the domain configuration determines the head permeability and hence the efficiency with which the head can read data; and the most recent write operation determines the domain configuration. In some cases, the reading efficiency of a given domain configuration may be so low as to produce multiple symbol and uncorrectable errors and an inability to read header information.

SUMMARY OF THE INVENTION

In a general feature of the invention, a thin film magnetic read/write head is conditioned by (i) causing the head to perform a first operation (e.g., a read operation), (ii) determining if the first operation was performed acceptably, and (iii) if not, causing the head to perform a second operation (e.g., a write operation) that is capable of increasing the likelihood that the head will be able to acceptably perform the first operation.

Preferred embodiments of the invention include the following features. The write operation is performed in a separate region of the medium from the region where data is stored. The existence of errors in data read from the medium is detected as an indication of whether the read operation was performed acceptably. After the write operation, the head performs the first (read) operation again. The error detection, writing, and reading steps may be repeated more than once, if necessary, until the head is able to perform the read operation acceptably.

The invention takes advantage of the fact that a write operation is capable of reconfiguring the domains and thus returning the head to a condition in which it can read from the disk. The procedure reduces the number of uncorrectable read errors, and may be included as one of several techniques used in a disk drive to recover from read errors.

Other advantages and features will become apparent from the following description of the preferred embodiment and from the claims.

DESCRIPTION OF THE PREFERRED EMBODIMENT

We first briefly describe the drawings.

STRUCTURE

Figure 1:
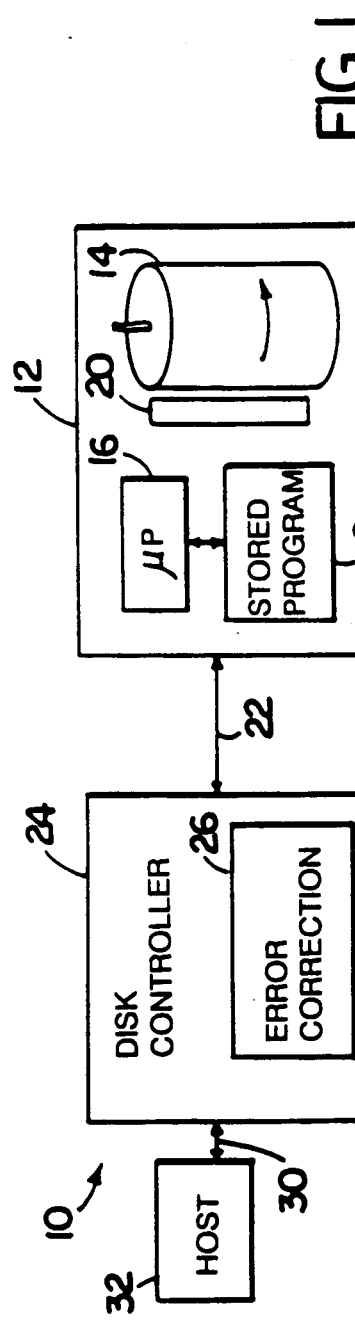
FIG. 1 is a block diagram of a host computer and a disk storage system.

Referring to FIG. 1, in a magnetic disk storage system 10, a disk drive unit 12 includes a rotating stack 14 of magnetic disks. A microprocessor 16 (controlled by a stored program 18) regulates the operation of a read/write head assembly 20 to cause it to read and write bits on the magnetic disks in accordance with instructions provided via a link 22 from a disk controller 24. Link 22 also carries the bits back and forth between disk controller 24 and disk drive 12, and carries status information from the disk drive back to the disk controller.

Disk controller 24 includes error correction circuitry 26 which implements an appropriate error correction code with respect to bits being sent to the disk drive for storage and with respect to possibly corrupted bit sequences read from the disks. A program controlled microprocessor unit 28 governs the delivery and receipt bits, instructions, and status information via link 22 and also communicates via a link 30 with a host computer 32. Link 30 carries (i) operating system commands from host computer 32 requesting the reading or writing of data, (ii) the data itself, and (iii) status information from disk controller 24.

Figure 2:
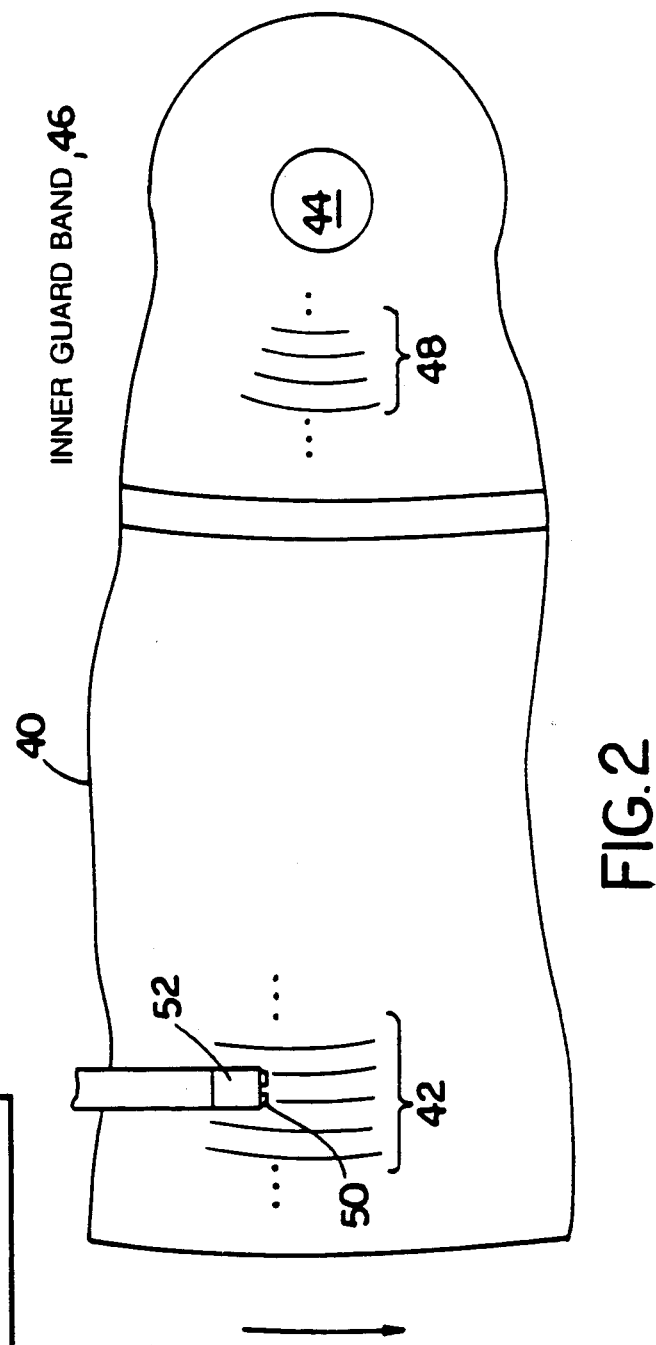
FIG. 2 is a diagrammatic top view of a portion of a magnetic disk.

Referring to FIG. 2, each surface of one of the magnetic disks 40 is organized in concentric tracks 42. Near the center 44 of the disk is an inner guard band 46 that separates the outer tracks (used for customer data) from inner tracks 48 used for diagnostic and other purposes. The read/write head assembly 20 (FIG. 1) includes at least one thin film head 50 mounted on a slider 52 which is supported on an arm as shown. The slider flies above the disk with the poles of the head positioned to read or write on a desired track.

OPERATION

Figure 3:
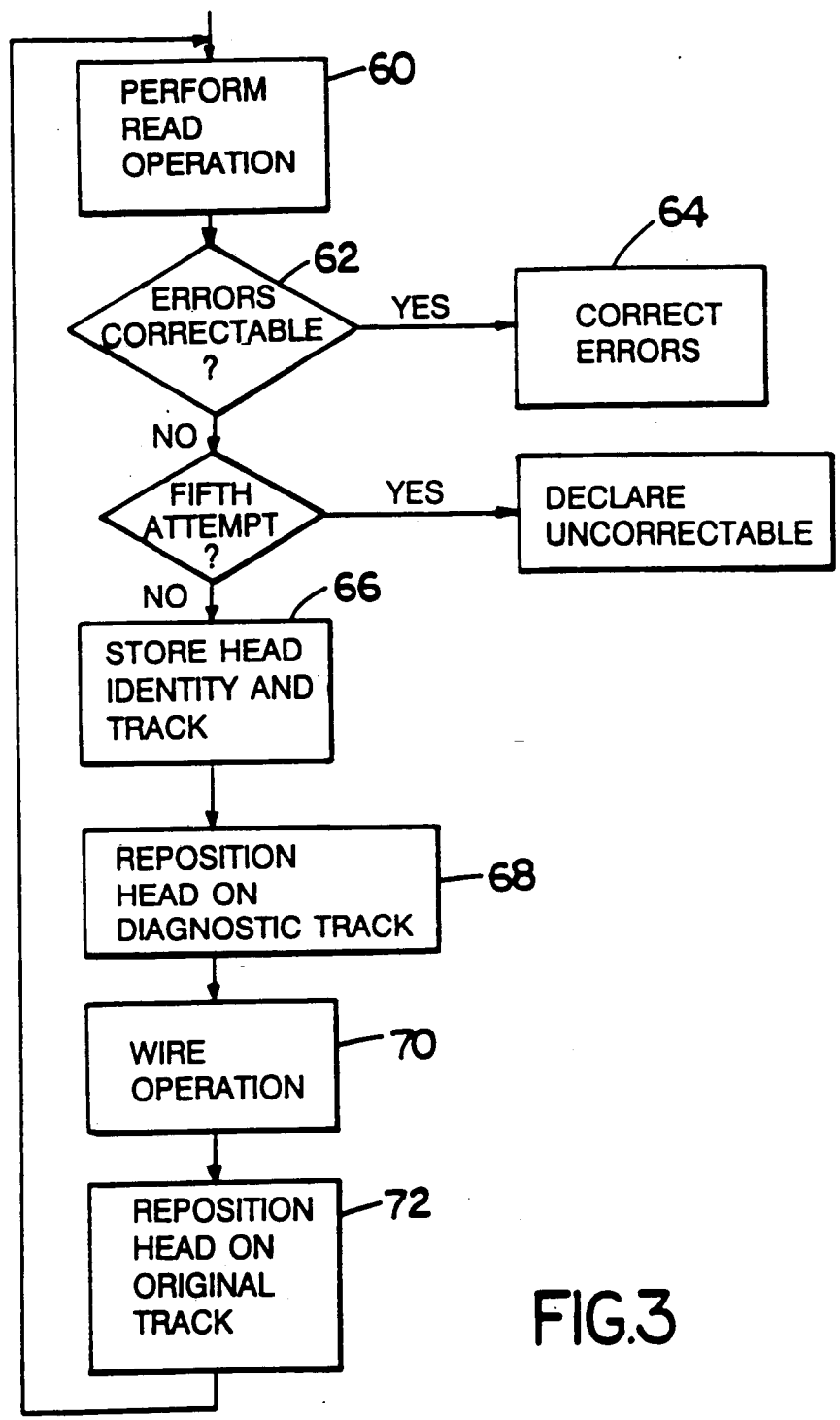
FIG. 3 is a flow chart of a procedure for conditioning a read/write head.

Referring to FIG. 3, when the operating system in host computer 32 asks disk controller 24 to read data in a specified block of the disk, controller 24 passes the instruction along to the disk drive 12. The head is then moved to the proper track and performs a read operation (block 60, FIG. 3) to read the information in the specified block. The information read from the disk is then returned to the disk controller. If the number of errors in the information is within the capacity of the error correction circuitry to handle (block 62), the errors are corrected (64) and the correct data is passed back to the host computer. On the other hand, if the errors are too numerous, the error correction circuitry indicates that condition to microprocessor 28. Microprocessor 28 then sends to disk drive 12 an error recovery instruction which tells the disk drive to take steps to attempt to improve the efficiency of the intended read operation.

In response to the error recovery instruction, microprocessor 16 executes a sequence of error recovery procedures, which may include, for example, adjusting the head position slightly to try to improve its centering over the track. The sequence of procedure also includes a head conditioning procedure which includes the following sequence of steps.

First, the identity of the head which failed to perform an acceptable read operation and its present track location are stored temporarily (66). Then the head is repositioned (68) over a diagnostic read/write track located inside the quard band. Next the head is caused to perform a write operation 70 on the diagnostic track. As explained above, this write operation typically results in a small chanqe in the domain configuration (and hence the permeability of the head poles) which may be sufficient to enable the head to perform an acceptable read operation. The head is then repositioned (72) at the oriqinal track location. Once the disk drive has completed all of the error recovery procedures, it reports that fact to the disk controller, which then aqain causes the disk drive to attempt the same read operation (60) as before. The error correction step (62) is repeated. When the errors are found to be uncorrectable for a fifth time (74), the block is declared uncorrectable (76).

Other embodiments are within the following claims.

We claim:

1. A method of conditioning a magnetic read/write head adapted for a storage medium on which data is recorded, comprising the steps of
    causing said head to perform a first operation on selected data on a storage medium,
    determining if the first operation was performed acceptably, and
    if not, causing said head to perform a second, different operation that is capable of increasing the likelihood that the head will be able to acceptably perform the first operation and that does not include performing an operation on data adjacent to said selected data.

2. The method of claim 1 wherein said first operation comprises a read operation.

3. The method of claim 1 wherein said second operation comprises a write operation.

4. The method of claim 1 further comprising, after said second operation, causing said head to perform said first operation again.

5. The method of claim 1 adapted for a magnetic medium on which data is recorded in a manner that permits detection of errors in data read from the medium, and wherein said step of determining whether said operation was performed acceptably comprises detecting the existence of errors in data read from said medium.

6. The method of claim 1 adapted for a magnetic medium on which data is recorded in a data region of said medium and wherein the second operation is performed in a region separate from the data region.

7. The method of claim 1 wherein the sequence of steps of said method is repeated more than once.

8. Apparatus for conditioning a magnetic read/write head adpated for a storage medium on which data is recorded, comprising
    a controller for causing said head to perform a first operation on selected data on a storage medium, and
    circuitry for determining if the first operation was acceptably performed,
    said controller being connected to cause said head to perform a second, different operation that is capable of increasing the likelihood that the head will be able to acceptably perform the first operation and that does not include performing an operation on data adjacent to said selected data.

9. A method of conditioning a magnetic thin film read/write head, comprising
    causing said head to perform a read operation on selected data on a storage medium,
    determining if the read operation was performed acceptably, and
    if not, causing said head to perform a write operation that is capable of increasing the likelihood that the head will be able to acceptably perform the read operation and that does not include performing either a write operation or a read operation on data adjacent to said selected data.

10. The method of claim 9 adapted for use with magnetic medium on which data is recorded in a data region of said medium and wherein the write operation is performed in a region separate from the data region.

11. A method for conditioning a read/write head so as to be able to recover a segment of information at a given track location from a disk after a read operation in which the segment of information was not recoverable, comprising the sequential steps of
    (a) causing the head to perform a write operation on a diagnostic track without reproducing segments of information stored at locations adjacent to said given location,
    (b) repositioning the head at said given location, and
    (c) causing the head to attempt to read said segment of information at said given location.

12. The method of claim 11 further comprising repeating steps (a) and (b) a plurality of times, and if the segment remains unrecoverable for a given number of times, designating the block to be unrecoverable.

13. The method of claim 9 further comprising repeating said read operation after said write operation.

14. A method of conditioning a magnetic read/write head adapted for a storage medium on which data is recorded, comprising the steps of
    causing said head to perform a read operation that is on selected data on a storage medium, said read operation being subject to errors caused by a temporary defect in said head,
    determining, based on the presence of said erors, if the read operation was performed acceptably, and
    if not, causing said head to perform a write operation that is capable correcting said defect to increase the likelihood that the head will be able to acceptably perform the read operation and that does not include performing either a write operation or a read operation on data adjacent to said selected data.

* * * * *

UNITED STATES PATENT AND TRADEMARK OFFICE
CERTIFICATE OF CORRECTION

PATENT NO. : 5,053,892

DATED : October 1, 1991

INVENTOR(S) : Supino, Jr. et al

Page 1 of 2

It is certified that error appears in the above-indentified patent and that said Letters Patent is hereby corrected as shown below:

On the title page, Item [56]:
    Change "4,812,928 3/1989 Kraus, 360/53" to --4,812,928 3/1989 Krause, 360/53--.

Col. 1, line 8, change "magqnetic" to --magnetic--.
       line 11, change "resultinq" to --resulting--.
       line 13, change "sinqle" to --single--.
       line 15, change "confiquration" to --configuration--.
       line 17, change "exchanqe" to --exchange--.
       line 17, change "enerqy" to --energy--.
       line 28, change "qenerated" to --generated--.
       line 29, change "alonq" to "along".
       line 32, change "alterinq" to --altering--.
       line 34, change "confiquration" to --configuration--.
       line 40, change "readinq" to --reading--.
       line 48, change "e.q.," to --e.g.,--.
       line 52, change "increasinq" to --increasing--.
       line 56, change "reqion" to --region--.
       line 66, change "reconfiqurinq" to --reconfiguring--.

Col. 2, line 4, change "advantaqes" to --advantages--.
       line 19, change "Referrinq" to --Referring--.
       line 22, change "requlates" to --regulates--.

UNITED STATES PATENT AND TRADEMARK OFFICE
CERTIFICATE OF CORRECTION

PATENT NO. : 5,053,892

DATED : October 1, 1991

INVENTOR(S) : Supino, Jr. et al

It is certified that error appears in the above-indentified patent and that said Letters Patent is hereby corrected as shown below:

```
Col. 3, line 17, change "chanqe" to --change--.
        line 21, change "oriqinal" to --original--.
        line 23, change "aqain" to -again--.
```

Signed and Sealed this

Twenty-eighth Day of December, 1993

Attest:

BRUCE LEHMAN

*Attesting Officer*   *Commissioner of Patents and Trademarks*